(12) United States Patent
Saikawa et al.

(10) Patent No.: US 7,573,669 B2
(45) Date of Patent: Aug. 11, 2009

(54) METHOD AND APPARATUS FOR WRITING PATTERN ON DISK

(75) Inventors: Manabu Saikawa, Kanagawa (JP);
Atsushi Takeichi, Kanagawa (JP);
Kazuhiko Washizu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 83 days.

(21) Appl. No.: 11/788,510

(22) Filed: Apr. 19, 2007

(65) Prior Publication Data
US 2007/0247742 A1 Oct. 25, 2007

(30) Foreign Application Priority Data
Apr. 19, 2006 (JP) .............. 2006-116064

(51) Int. Cl.
*G11B 21/02* (2006.01)
*G11B 5/596* (2006.01)
(52) U.S. Cl. ..................... 360/75; 360/77.08
(58) Field of Classification Search ................ None
See application file for complete search history.

(56) References Cited

U.S. PATENT DOCUMENTS

| 6,631,046 | B2 | 10/2003 | Szita et al. |
| 7,006,322 | B2 | 2/2006 | Sado |
| 2002/0176199 | A1* | 11/2002 | Gomez et al. .............. 360/75 |
| 2003/0218821 | A1* | 11/2003 | Sado ........................ 360/75 |
| 2006/0056093 | A1* | 3/2006 | Ehrlich et al. ............. 360/75 |
| 2006/0126213 | A1* | 6/2006 | Kitamura et al. ........... 360/75 |
| 2007/0273999 | A1* | 11/2007 | Utsumi et al. ............. 360/75 |

FOREIGN PATENT DOCUMENTS

| JP | 2003-338147 | 11/2003 |
| JP | 2004-303325 | 10/2004 |

* cited by examiner

*Primary Examiner*—Andrew L Sniezek
(74) *Attorney, Agent, or Firm*—Townsend and Townsend and Crew LLP; Patrick Duncan (57) ABSTRACT

Embodiments in accordance with the present invention ensure that the pitch of a servo write track is accurately controlled. According to one embodiment of the present invention, a Self Servo Write (SSW) uses different methods and sequences to identify read-write offsets (RWOs) and calculate target positions in inner and outer diameter sides of a magnetic disk. In the inner diameter-side area, the SSW controller uses the readout of a radial pattern written on a recording surface and a reference value to identify the RWO. The SSW controller uses the RWO value identified in the inner diameter-side area to anticipate an RWO value in the outer diameter-side area. In the outer diameter-side area, the SSW controller uses the anticipated RWO value to determine the target position of each servo write track.

6 Claims, 8 Drawing Sheets

METHOD AND APPARATUS FOR WRITING PATTERN ON DISK

CROSS-REFERENCE TO RELATED APPLICATION

The instant nonprovisional patent application claims priority to Japanese Application No. 2006-116064, filed Apr. 19, 2006 and incorporated by reference in its entirety herein for all purposes.

BACKGROUND OF THE INVENTION

Disk drive apparatuses that use various types of recording disks, such as an optical disk, a magneto-optical disk and a flexible magnetic disk, are known. Among them, hard disk drives (HDDs) have been widely used as a computer recording apparatus and one of the recording apparatuses essential for current computer systems. In addition to computer systems, HDDs are increasingly finding application thanks to its excellent characteristics, for example in video image recording/reproducing apparatuses, car navigation systems, mobile phones and as removable memories used in digital cameras.

A magnetic disk used in an HDD has a plurality of concentrically formed data tracks and servo tracks. The servo track has a plurality of servo data blocks (servo patterns) spaced apart from each other in the circumferential direction. User data is recorded in the area between servo sectors. A head element unit in the form of a thin film element accesses a desired area (address) according to the servo data to write or read user data.

Each servo pattern (hereinafter referred to as a product servo pattern) includes a cylinder ID, a sector number and a burst pattern. The cylinder ID represents a track address and the sector number represents a sector address in a track. The burst pattern has positional information on the magnetic head relative to a track.

As described above, each track has product servo patterns in the form of multiple sectors spaced apart from each other in the circumferential direction. Product servo patterns located at the same position in the circumferential direction, that is, having the same sector number, are aligned (in phase) in the circumferential direction throughout the tracks. The product servo pattern is written to the magnetic disk in the factory before shipment of the HDD as a product. In general, product servo patterns have been conventionally written using a servo writer as an external apparatus. After the HDD is mounted on the servo writer and the servo writer positions the head in the HDD by means of a positioner (external positioning mechanism), a product servo pattern generated by a product servo pattern generation circuit is written to the magnetic disk.

Currently, the writing process of the product servo pattern (Servo Track Write: STW) takes up a major part of the HDD manufacturing cost. Particularly, in recent years, competition to increase HDD capacity have heated up, which has accordingly increased TPI (Track Per Inch). When the TPI increases, the number of tracks increases and the track width (track pitch) decreases. These have increased the STW time and driven sophistication of servo writers, thereby contributing to increased STW cost. To reduce the cost, efforts have been made, for example, to reduce the cost of servo writers and the amount of the STW time.

SSW (Self Servo Write) has been proposed as one of approaches to solve the above problem. Unlike conventional STW, SSW uses only the mechanical feature in the HDD body along with an external circuit to control the spindle motor (SPM) and the voice coil motor (VCM) in the HDD so as to write a product servo pattern, thereby reducing the cost of the servo writer.

The SSW takes advantage of the fact that a read element and a write element of the head element unit are disposed at different positions in the radial direction (hereinafter referred to as a read-write offset), so as to use the read element to read patterns already written on the inner or outer diameter side for positioning the head element unit and use the write element to write a new pattern on a desired track separated by the read-write offset. In addition to the product servo pattern, SSW writes other patterns on the recording surface and uses them to perform head position control and timing control.

In general, an HDD has a plurality of recording surfaces, a plurality of head element units corresponding to the recording surfaces and an actuator that supports the plurality of element units. SSW uses one head element unit selected from the plurality of head element units (hereinafter referred to as a propagation head) to read a pattern on a recording surface and uses the signal of the readout pattern to control the actuator, so as to position the plurality of head element units. The positioned head element units simultaneously write patterns on the respective recording surfaces. For example, Japanese Laid-Open Patent No. 2003-338147 (Patent Document 1) discloses a method for determining a track pitch considering that the read-write offset changes depending on the radial position.

When the SSW is used to write a product servo pattern, it is important to write the pattern for each track at a desired track pitch. In one approach, the written pattern is actually read out and the readout is compared with a preset reference value. The track pitch is controlled by controlling the position of the head such that the measured value and the reference value coincide. In this way, each track pitch can coincide with the desired value.

Specifically, the SSW calculates function values of the readout amplitudes of the patterns on three adjacent tracks and moves the head such that the function values coincide with the preset reference value. The reference value can be determined by using a rotary positioner to write an ideal pattern in an HDD of the same design and actually measuring the function value of the pattern.

However, in the actual SSW, there are product-to-product variations. Thus, track pitches controlled based on the reference value have shown that they significantly vary in some areas depending on products. Particularly, patterns sequentially written from the inner diameter side to the outer diameter side of the magnetic disk based on the reference value have shown that track pitches in the outer diameter-side area significantly vary.

BRIEF SUMMARY OF THE INVENTION

Embodiments in accordance with the present invention ensure that the pitch of a servo write track is accurately controlled. According to the particular embodiment of the present invention disclosed in FIG. 1, a SSW uses different methods and sequences to identify read-write offsets (RWOs) and calculate target positions in inner and outer diameter sides of a magnetic disk 11. In the inner diameter-side area, the SSW controller 22 uses the readout of a radial pattern written on a recording surface and a reference value to identify the RWO. The SSW controller 22 uses the RWO value identified in the inner diameter-side area to anticipate an RWO value in the outer diameter-side area. In the outer diameter-side area, the SSW controller 22 uses the anticipated RWO value to determine the target position of each servo write track.

DETAILED DESCRIPTION OF THE INVENTION

Embodiments in accordance with the present invention relate to a method and an apparatus for writing a pattern on a disk, and particularly to writing a pattern using a head with a read element and a write element disposed at different positions in the radial direction of the disk.

An aspect of embodiments in accordance with the present invention is a method for writing a pattern on each track on a disk using a head having a read element and a write element disposed at different positions in the radial direction of the disk. In this method, the read element reads a pattern written by the write element and the readout is used to identify the offset value between the read element and the write element in the radial direction. Based on the identified offset value, the readout of the pattern on the disk obtained from the read element is used to move and position the write element. The write element writes a pattern at the track position where the write element is positioned. After repeating the identification of the offset value, the moving of the write element and the writing of a pattern a plurality of times, the preceding offset values identified by using the readouts are used to anticipate the following offset values. Based on the anticipated offset values, the write element is sequentially moved to each track position and writes a pattern. By using the preceding offset values identified by using the readouts to anticipate the following offset values, product-to-product variations in track pitch can be reduced and the offset value can be easily and accurately anticipated.

It may be desirable to use the relationship between the offset values identified by using the readouts and the tracks on which patterns are written to anticipate the offset value corresponding to each of the following tracks. This relationship can be easily identified in the pattern writing process, so that the offset value can be more easily and accurately anticipated. Furthermore, it may be desirable to use the rate of change in the offset values identified by using the readouts for the tracks on which patterns have been written to anticipate the rate of change in the offset values for the following tracks, and then use the anticipated rate of change to identify the offset value corresponding to each of the following tracks. The variation in the rate of change in offset value is small, so that the offset value can be more easily and accurately anticipated. Moreover, it may be desirable to use the relationship of the number of tracks between the tracks, each having an offset value identified by using the readout being an integral multiple of the track pitch, with the offset values of the tracks so as to anticipate the rate of change in offset values for the following tracks. This allows efficient and accurate anticipation.

Preferably, the offset values identified by using the readouts for the tracks after a selected track are used to anticipate the change in the following offset values. In this way, variation in the data used for anticipation can be reduced for more accurate anticipation. Embodiments of the present invention are effective in the case where the write element writes a pattern on each track while the head is sequentially moved from the inner diameter side to the outer diameter side of the disk. Alternatively, the difference between a preset reference value and the readout obtained from the read element to identify the offset value is used for more accurate control over the track pitch in the area where the readout is obtained.

Another aspect of embodiments of the present invention is an apparatus for writing a pattern on each track on a disk. The apparatus includes a write element that writes a pattern on the disk, a read element that is disposed at a position different from that of the write element in the radial direction of the disk and reads the pattern written by the write element, an actuator that supports and moves the read element and the write element, and a controller that uses the readout obtained by using the read element to read the pattern on the disk so as to control the actuator and moves and positions the write element. In a first area of the disk, the controller uses the readout of the pattern that is written by the write element and read by the read element to identify the offset value between the read element and the write element in the radial direction. Based on the offset value, the controller uses the readout obtained from the read element to sequentially move and position the write element at each track position. The controller further uses the offset value identified by using the readout in the first area to anticipate an offset value in a second region of the disk. In the second area, the controller sequentially moves and positions the write element at each track position based on the anticipated offset value. By using the preceding offset values identified by using the readouts to anticipate the following offset values, product-to-product variations in track pitch can be reduced and the offset value can be easily and accurately anticipated.

According to embodiments of the present invention, the pitch of the servo write track can be accurately controlled.

An embodiment to which the present invention can be applied will be described below. For the sake of clarity of the description, omission and simplification is made to the following description and the drawings as appropriate. In the drawings, same elements bear same reference characters and redundant description will be omitted as required for the sake of clarity of the description. In the following description, an embodiment of the present invention will be described with reference to writing a servo pattern in a hard disk drive (HDD) as an example of a disk drive apparatus.

Figure 1:
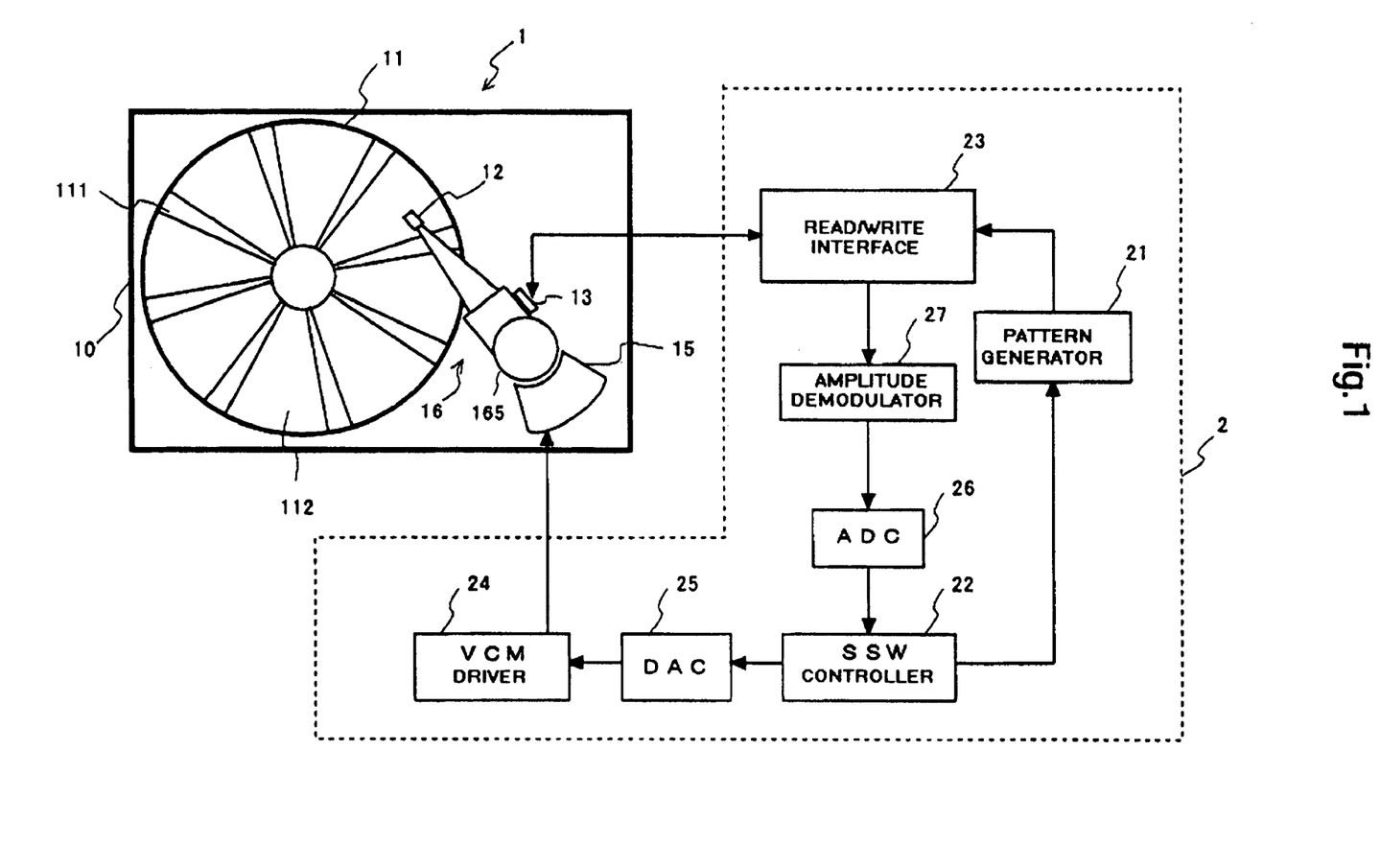
FIG. 1 is a block diagram diagrammatically showing the logical configuration of the HDA and the servo write control device that controls servo write performed by the HDA according to an embodiment of the present invention.

FIG. 1 is a block diagram diagrammatically showing the logical configuration of a head/disk assembly (HDA) 1 and a servo write control device 2 that controls servo write performed by the HDA 1. The HDA 1 is a component of a hard disk drive (HDD) and includes an enclosure 10 having a base and a top cover that closes an upper opening of the base. The HDA 1 has a magnetic disk 11, a head slider 12, a preamplifier IC 13, a voice coil motor (VCM) 15 and an actuator 16 housed in the enclosure. The head slider 12 is supported at the end of the actuator 16. The preamplifier IC 13 is fixed close to a pivot shaft 165 of the actuator 16.

In addition to the HDA 1, the HDD includes a circuit board fixed to the outside of the enclosure 10. An IC for signal processing and control processing is mounted on the circuit board. Servo write in this embodiment does not use the circuit on the control circuit board, but the servo write control device 2 controls the servo write. The servo write in this embodiment directly controls the mechanical feature of the HDA 1 to write servo data (servo patterns) to the magnetic disk 11. The magnetic disk 11 is a nonvolatile storage disk whose magnetic layer is magnetized to store data.

Such servo write is called self-servo write (SSW). The SSW uses each component in the enclosure 10 in such a way that servo data used in writing and reading user data is written to the magnetic disk 11. In the following description, the servo data is called a product servo pattern. Alternatively, the control circuit implemented in the HDD may be used to perform the servo write in this embodiment.

The servo write control device 2 controls and performs the SSW in this embodiment. The servo write control device 2 includes an SSW controller 22. The SSW controller 22 controls the entire SSW. The SSW controller 22 controls, for example, positioning of the head slider 12 and pattern generation. The SSW controller 22 can be formed of a processor that operates according to a pre-stored microcode. The SSW controller 22 performs control processing in response to a request from an external information processor and transmits necessary information, such as error information, to the information processor.

To write a pattern to the magnetic disk 11, the SSW controller 22 instructs a pattern generator 21 to generate a predetermined pattern. A read/write interface 23 converts the pattern generated by the pattern generator 21 into a pattern signal and transfers the pattern signal to the preamplifier IC 13. The preamplifier IC 13 amplifies the signal and transfers it to the head slider 12, which writes the pattern to the magnetic disk 11.

The SSW controller 22 uses a signal read by the head slider 12 to control the actuator 16, so as to move and position the head slider 12. Specifically, the signal read by the head slider 12 is inputted to an amplitude demodulator 27 through the RW interface 23. The readout signal demodulated by the amplitude demodulator 27 is converted from analog to digital by an A/D converter 26 and inputted to the SSW controller 22. The SSW controller 22 analyzes the resultant digital signal and calculates a numerical control signal.

The SSW controller 22 sends that value to a D/A converter 25. The D/A converter 25 converts the received data from digital to analog and feeds a control signal to a VCM driver 24. The VCM driver 24 supplies a control current to the VCM 15 based on the control signal to move and position the head slider 12. The device including the servo write control device 2 and the components other than the magnetic disk 11 of the HDA 1 is hereinafter referred to as a self-servo track writer (SSTW). That is, the SSTW writes a servo pattern onto a recording surface of the magnetic disk 11.

Figure 2:
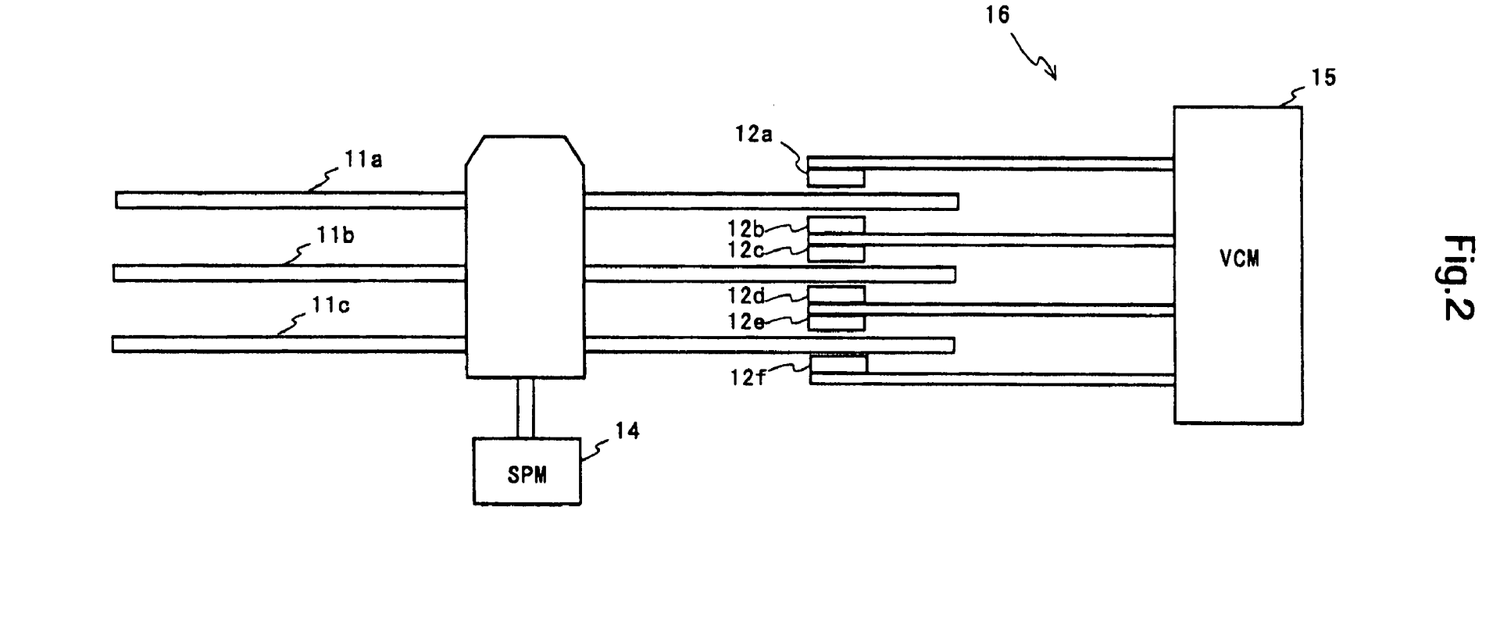
FIG. 2 diagrammatically shows the inner mechanism of the HDA according to an embodiment of the present invention.

As shown in FIG. 2, the HDA 1 in this embodiment has a plurality of magnetic disks 11a to 11c, which are fixed to the rotary shaft of a spindle motor (SPM) 14. The SPM 14 rotates the magnetic disks 11a to 11c fixed thereto at a predetermined angular velocity. Both sides of each of the magnetic disks 11a to 11c are recording surfaces and the HDA 1 has a plurality of head sliders 12a to 12f corresponding to the respective recording surfaces.

The head sliders 12a to 12f are fixed to the actuator 16. The actuator 16 is connected to the VCM 15 and is pivoted around the pivotal shaft 165 to move the head sliders 12a to 12f above the recording surfaces of the magnetic disks 11a to 11c in the radial direction. Each of the head sliders 12a to 12f has a slider and a head element unit (not shown) formed thereon in the form of a thin film element. The head element unit, which is an example of the head, includes a write element that converts an electrical signal into a magnetic field according to write data and a read element that converts a magnetic field from the magnetic disk 11 into an electrical signal.

The preamplifier IC 13 selects one head slider for reading data from the plurality of head sliders 12a to 12f, amplifies (preamplifies) a reproduction signal reproduced by the selected head slider with a constant gain, and outputs the resultant signal to the servo write control device 2. The preamplifier IC 13 also amplifies the signal from the servo write control device 2 and outputs it to the selected head slider. Typically, when a product servo pattern is written, all head sliders 12a to 12f are simultaneously selected. Alternatively, part of the head sliders may be selected for sequential writing.

Referring now again to FIG. 1, in the SSW, a plurality of servo areas 111 are formed on the recording surfaces of the magnetic disk 11 in such a way that the servo areas extend from the center of the magnetic disk 11 in the radial direction and are formed spaced apart at a predetermined angle. FIG. 1 illustrates eight servo areas. On each of the servo areas 111 is recorded a product servo pattern for positioning the head slider when it reads/writes user data. A data area 112 is provided between two adjacent servo areas 111, where user data is recorded. The servo areas 111 and the data areas 112 of respective predetermined angles are alternately arranged.

Figure 3:
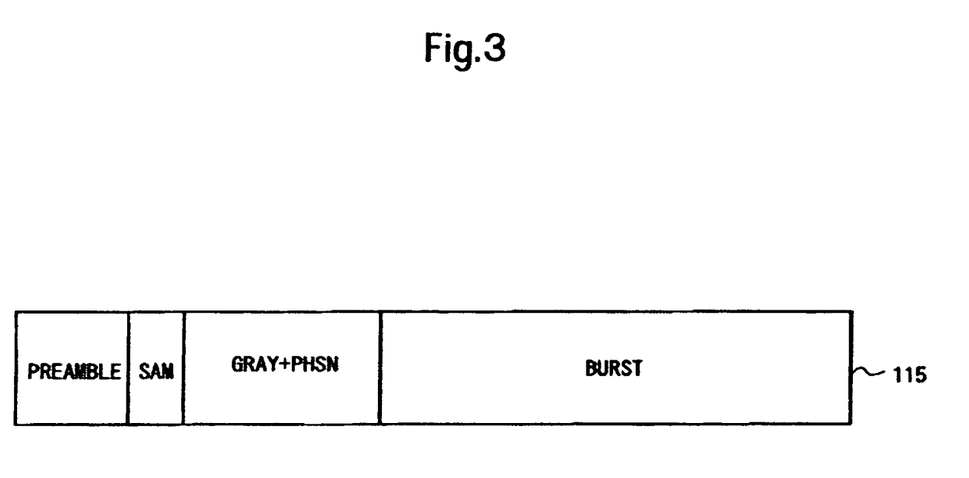
FIG. 3 shows the data format of the product servo pattern for one servo sector according to an embodiment of the present invention.

FIG. 3 shows the data format of the product servo pattern 115 for one servo sector. In one serve area 111, a product servo pattern 115 for one servo sector is formed in the circumferential direction and product servo patterns 115 for a plurality of servo sectors are formed in the radial direction. The product servo pattern 115 includes a PREAMBLE, a servo address mark (SAM), a track ID (GRAY) including a gray code, a serve sector number (PHSN) (which is optional) and a burst pattern (BURST). SAM is a portion indicating that actual information, such as the track ID, follows and has accurate correlation with the position where an SAM signal, which is a timing signal that is usually retrieved when the SAM is found, is written to the magnetic disk 11.

The burst pattern (BURST) is a signal indicating a more precise position of a servo track represented by the track ID. The burst pattern typically includes four amplitude signals A, B, C and D written in a staggered arrangement at positions slightly different from each other on respective servo track circles (see FIG. 5). Each of these bursts is a single-frequency signal having the same period as that of the PREAMBLE.

Figure 4:
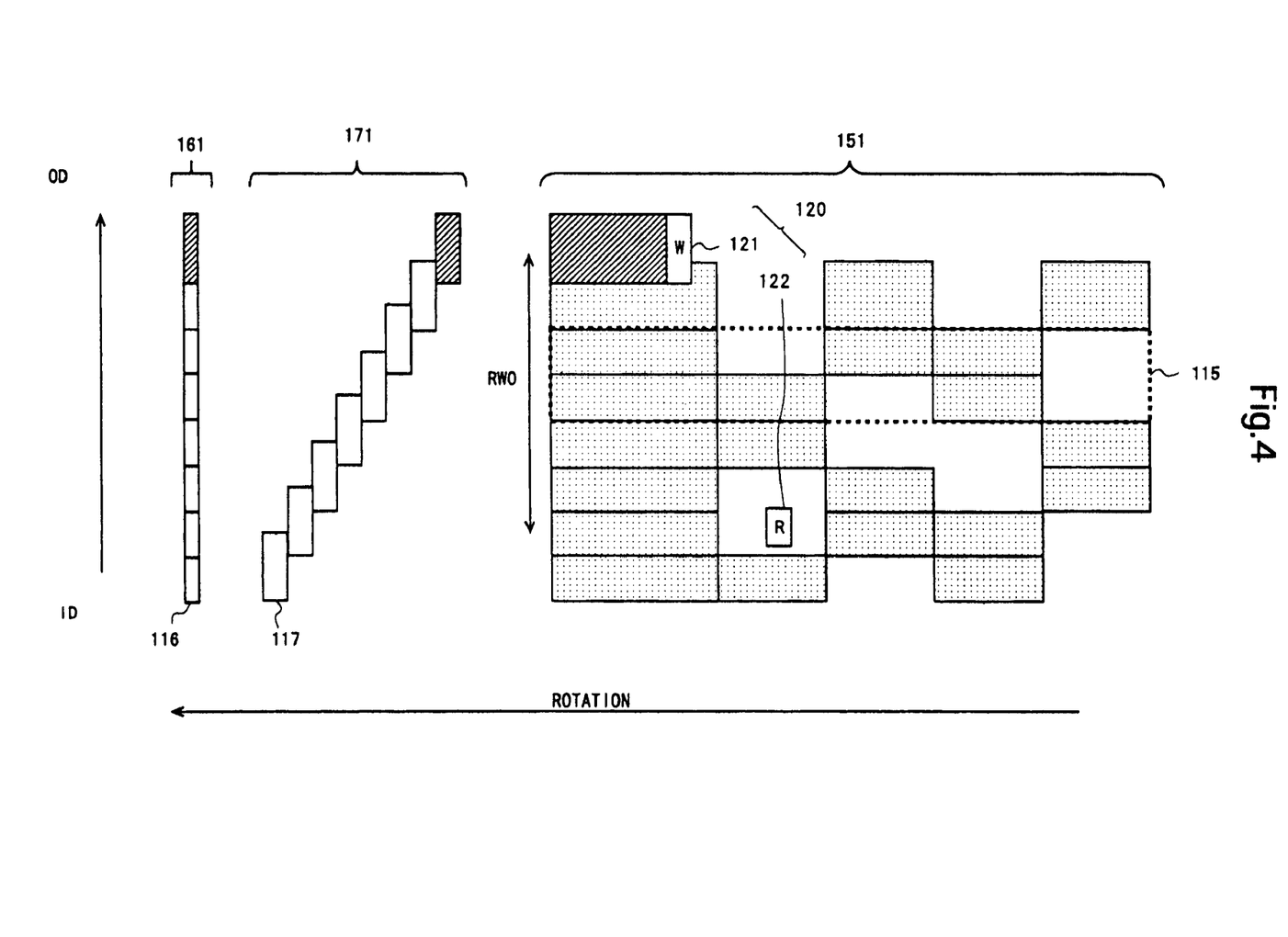
FIG. 4 diagrammatically shows patterns that the SSTW writes onto a recording surface and how to write the same according to an embodiment of the present invention.

FIG. 4 diagrammatically shows patterns that the SSTW in this embodiment writes onto a recording surface and how to write the same. FIG. 4 shows a pattern corresponding to one servo sector. The SSTW writes a timing pattern 116 and a radial pattern 117 as well as the product servo pattern 115. The timing pattern 116 is pulse-like and the radial pattern 117 includes bursts at a predetermined frequency. Therefore, one sector in the SSW in this embodiment has an area 151 where the product servo pattern 115 is written, an area 161 where the timing pattern 116 of one slot is written and an area 171 where the radial pattern 117 of one slot is written. The timing pattern 116 and the radial pattern 117 are written in the data area 112 where user data is stored.

The SSTW refers to a pattern that the SSTW itself has written to the magnetic disk 11 and uses temporal and spatial information obtained from the resultant signal to write the next pattern at a position shifted in the radial direction by a read-write offset while performing temporal control (timing control in the circumferential direction) and spatial control (positional control in the radial direction) of the head element unit 120.

The read-write offset (RWO) is a distance between the write element 121 and the read element of the head element unit 120 in the radial direction. Specifically, it is a distance on the magnetic disk 11 in the radial direction between the centers of the read element 122 and the write element 121. The read-write offset changes depending on the radial position on the magnetic disk 11. The write element 121 and the read element 122 are also shifted in the circumferential direction and the distance between the two elements in this direction is called a read-write separation.

The SSTW in this embodiment selects one of the plurality of head element units 120 (for example, the head element unit of the head slider 12b in FIG. 3) and uses the selected head element unit 120 to read the pattern on the recording surface. This head element unit 120 is hereinafter referred to as a propagation head. Then, the SSTW uses the signal read by the propagation head to control the actuator 16, so as to simultaneously write patterns onto the recording surfaces using all head sliders 12a to 12f.

In this embodiment, as shown in FIG. 4, the read element 122 is disposed on the inner diameter (ID) side of the magnetic disk 11 relative to the write element 121. Patterns are sequentially written from the inner diameter side to the outer diameter side. By writing patterns from the inner diameter side, the read element 122 can read the patterns that have been already written by the write element 121. In this way, using the pattern read by the read element 122 to position the head element unit 120, the write element 121 can write a new pattern. Alternatively, by changing the positions of the write element 121 and the read element 122, the SSW can also be initiated from the outer side of the magnetic disk 11.

Specifically, the SSTW uses the radial pattern 117 to position the head element unit 120, while the SSTW measures the pattern writing timing with reference to the timing pattern 116. After a predetermined period of time has passed from the timing when the read element 122 of the propagation head read the timing pattern, the write element 121 of each head element unit 120 writes (part of) the product servo pattern 115. The timing pattern 116 in the next sector will be written with reference to the readout of the timing pattern 116 in the previous sector.

Figure 5:
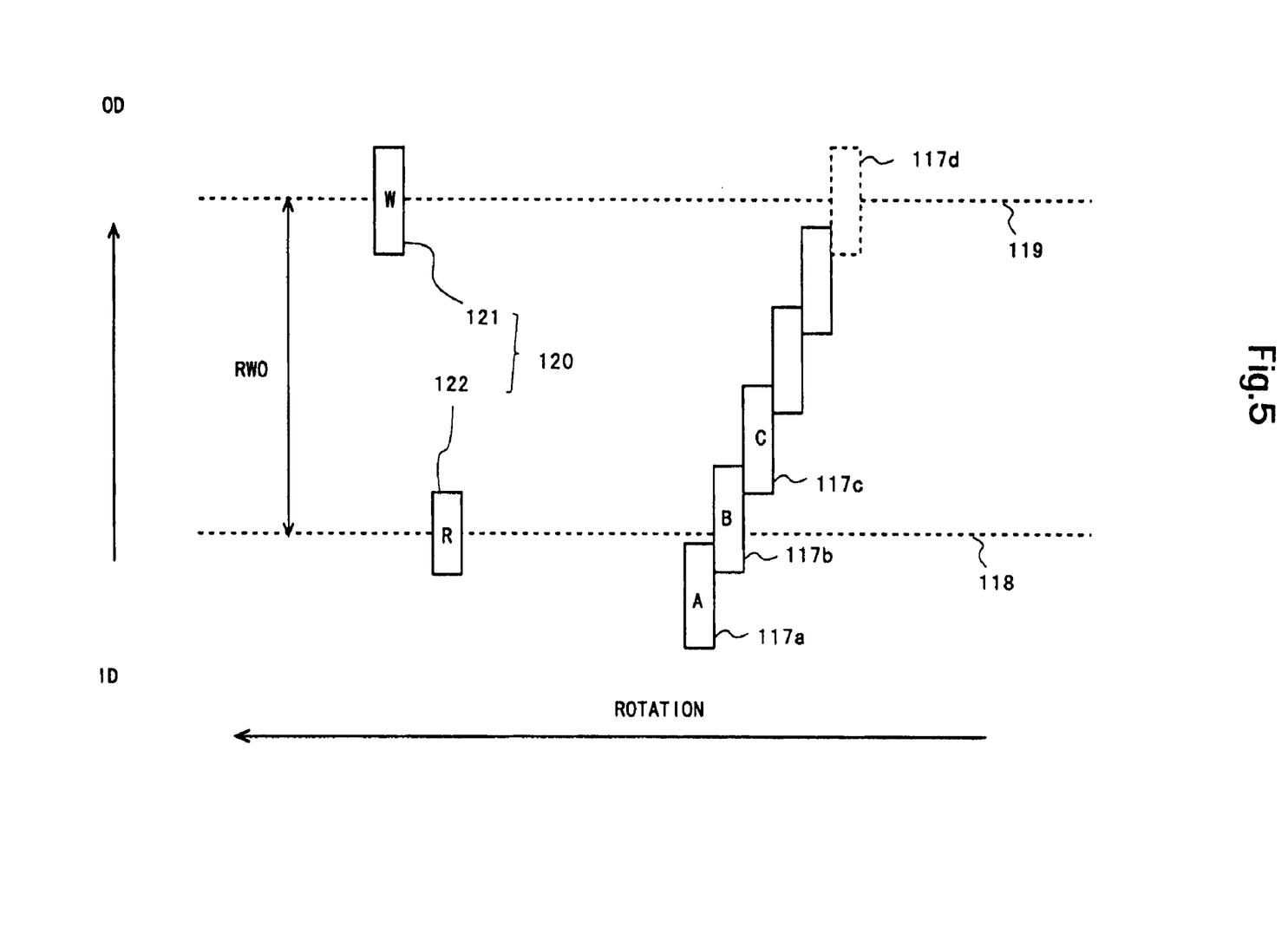
FIG. 5 diagrammatically shows an example of how to position the read element at a target position and use the write element to write patterns according to an embodiment of the present invention.

As shown in FIG. 4, the write element 121 writes product servo patterns 115 such that part of them overlap in the radial direction. That is, when a product servo pattern is formed, it overwrites part of the previous pattern on the outer diameter side. FIG. 5 shows that four product servo patterns 115 have been already written and that the write element 121 is forming the fifth product servo pattern when counted from the inner diameter side.

The write element 121 writes half a product servo pattern during one excursion around the magnetic disk. The track corresponding to half a product servo pattern is hereinafter referred to as a servo write track. The track of a product servo pattern is referred to as a servo track. The track pitch of a servo write track is half the servo track pitch. In the example shown in FIG. 4, seven servo write tracks have already been written and the write element 121 is writing the eighth servo write track when counted from the inner diameter side.

The timing patterns 116 in the same sector are formed substantially at the same position in the circumferential direction. On the other hand, each radial pattern 117 is formed at a different circumferential position from the radially adjacent radial patterns 117. That is, adjacent radial patterns 117 are disposed at different circumferential positions, while adjacent radial patterns 117 are formed such that they overlap each other in the radial direction. In FIG. 4, although each radial pattern 117 is sequentially shifted toward the right as it proceeds toward the outer diameter side, radial patterns 117 in further outer tracks are written at positions shifted toward the left in the figure.

The SSW controller 22 uses the readout signal from the radial pattern 117 to position the head. For example, referring to FIG. 5, a specific description will be made of positioning the read element 122 at a target position 118. In FIG. 5, the radial dimension of the read element 122 corresponds to the read width and the dimension of the write element 121 corresponds to the write width. The magnetic disk 11 rotates from right to left in the figure, so that the read element 122 moves from left to right in the figure. The write element 121 writes the corresponding servo write track at a target position 119.

To position the write element 121 at the target position 119, the SSW controller 22 positions the read element 122 at the target position 118 situated on the inner diameter side relative to the target position 119 by the read-write offset (RWO). The read element 122 reads the radial patterns 117a, 117b and 117c. The SSW controller 22 determines function values (hereinafter referred to as PES values) of the amplitudes (A, B and C) of the radial patterns 117a, 117b and 117c and uses the values as target values to position the read element 122.

With the read element 122 positioned at the target position 118, the write element 122 121 writes a radial pattern 117d. In each pattern writing process, the target position of the read element 122 typically does not coincide with the center of each radial pattern 117 but is shifted in the radial direction.

Thus, in the SSW in this embodiment, patterns are sequentially written starting from a servo write track on the inner diameter side. To allow the write element 121 to write a pattern on a target servo write track, the read element 122 is positioned at a position is situated on the inner diameter side relative to the target position of the write element 121 by the read-write offset. The read-write offset changes depending on the radial position. Therefore, when a pattern is written on each servo write track, the SSW controller 22 identifies the read-write offset corresponding to that servo write track, calculates the target position of the read element 122, and moves and positions the read element 122 accordingly.

Figure 6:
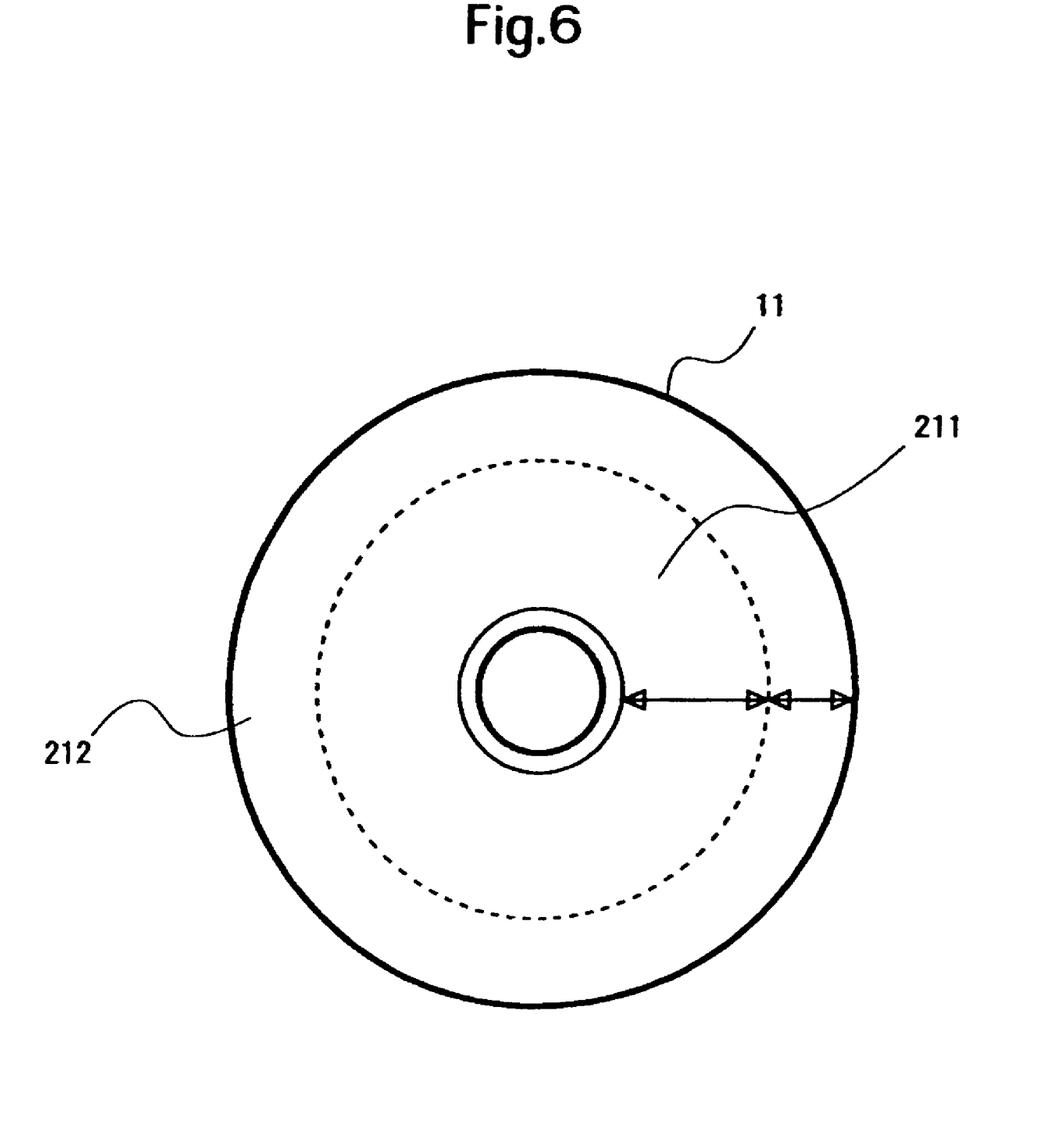
FIG. 6 diagrammatically shows the inner diameter-side area where a pattern is written by performing APC measurement and the outer diameter-side area where a pattern is written by using a read-write offset anticipated from the read-write offset in the inner diameter-side area according to an embodiment of the present invention.

The SSW in this embodiment uses different methods and sequences to identify read-write offsets and calculate target positions (target PES values) in the inner and outer diameter sides of the magnetic disk 11. Specifically, as shown in FIG. 6, in the inner diameter-side area 211, the read element 122 reads the radial pattern 117 written on the recording surface, and the SSW controller 22 identifies the read-write offset based on the readout.

On the other hand, to write a pattern in the outer diameter-side area 212, the SSW controller 22 uses the read-write offset value identified in the inner diameter-side area to anticipate the change in the following read-write offset values. In the outer diameter-side area, the SSW controller 22 uses the anticipated read-write offset value to determine the target position of the read element 122 corresponding to each servo write track.

Firstly, the sequence of pattern writing in the inner diameter-side area will be described. As described above, the SSW controller 22 determines the target position of the read element 122 from the read-write offset corresponding to each servo write track. The SSW controller 22 in this embodiment uses a read-write offset value expressed in terms of the number of servo write tracks. Specifically, at each position of the write element where a pattern is written, a value indicating the number of servo write tracks corresponding to the read-write offset (hereinafter referred to as Ref) is used. Ref is a read-write offset value scaled by the servo write track pitch and the number of tracks at the position of the write element. Ref is not necessarily an integer.

The SSW controller 22 changes Ref for each servo write track to position the read element 122. The SSW controller 22 also sequentially moves the head sliders 12a to 12f such that a value called APC coincides with a predetermined specified value. In this way, a product servo patterns at a desired pitch is written onto each recording surface.

The APC is calculated from readout amplitudes A, B and C of the radial patterns 117 on three adjacent servo write tracks. Specifically, with the propagation head positioned at the center of one of the radial patterns 117, the readout amplitudes A, B and C of the radial patterns 117 are obtained. The APC is calculated by the equation of (A+C/B).

Figure 7:
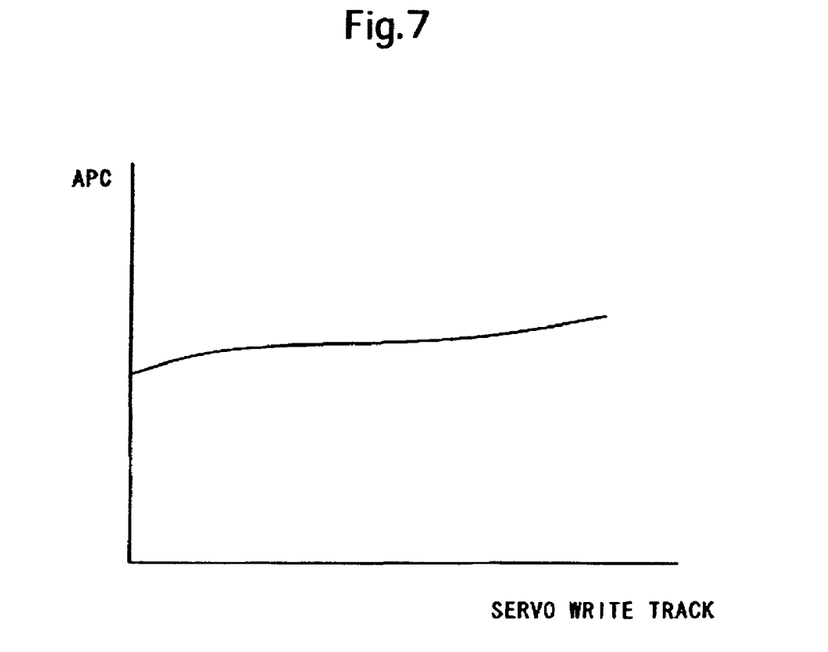
FIG. 7 diagrammatically shows one example of the reference APC with respect to the servo write track according to an embodiment of the present invention.

A target reference APC is preset for each servo write track. As illustrated in FIG. 7, the reference APC is not constant, but changes depending on the location of the servo write track. The SSTW uses the reference APC as a target to write the pattern of each servo write track, so as to control the servo write track pitch to be a desired value. The reference APC is predetermined in the development stage. Specifically, the reference APC can be determined by using a rotary positioner to write an ideal pattern in an HDA of the same type and measuring the APC of that pattern.

Specifically, the SSW controller 22 measures the APC every several hundred servo write tracks. The difference between the measured value and the reference APC is fed back to the Ref. That is, the SSW controller 22 uses the difference between the measured APC and the reference APC to correct the Ref, so as to identify a read-write offset value in accordance with the actual measurement. In this way, the SSTW uses the read element 122 to read radial patterns 117 and calculates the APC from the readouts. The SSW controller 22 determines Ref and target PES values such that the APC coincides with (approaches) a specified value.

To accurately control the track pitch, it is preferable to measure the APC for each servo write track. However, measuring the APC for each servo write track requires an enormous amount of time and affects the yield. Therefore, as described above, it is preferable to measure the APC every plurality of servo write tracks to calibrate the Ref. To reduce the amount of error, it is preferable to measure the APC for a plurality of servo write tracks and use the average value.

In this way, in the inner diameter-side area, the read element 122 reads the pattern on a recording surface and the SSW controller 22 uses the readout to identify the read-write offset value corresponding to each servo write track. On the other hand, in the outer diameter-side area, the SSW controller 22 uses an anticipated read-write offset value to perform positioning for each servo write track.

The SSW controller 22 uses the Ref identified by the APC measurement in the inner diameter-side area to anticipate the change in Ref in the outer diameter-side area. The SSW controller 22 determines each target position of the read element 122 based on the profile of the anticipated Ref. Specifically, the SSW controller 22 uses the anticipated Ref corresponding to each servo write track on which the write element 121 writes a pattern so as to determine each target PES value for the corresponding read element 122. The following description is an example of a read-write offset monotonously increasing as the head element unit 120 moves from the inner diameter side to the outer diameter side. This condition is preferably satisfied from the point of view of accurate and easy control of SSW.

Figure 8:
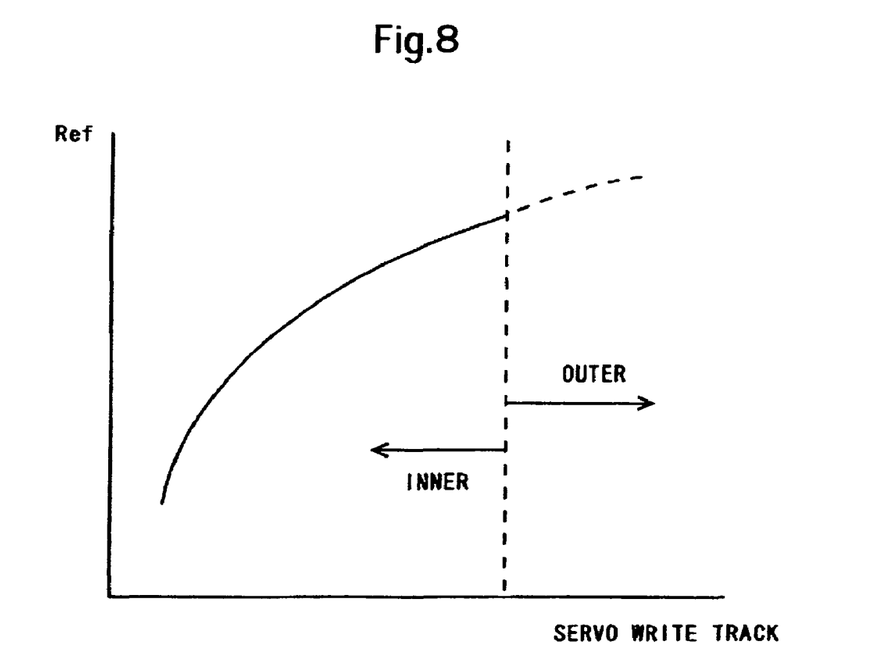
FIG. 8 is a graph diagrammatically showing the change in read-write offset with respect to the servo write track according to an embodiment of the present invention.

FIG. 8 is a graph diagrammatically showing the change in read-write offset with respect to the servo write track. The X axis represents the order (servo write track number) of the servo write tracks on which patterns are written, while the Y axis represents the read-write offset at each servo write track position. The read-write offset is expressed in terms of Ref, that is, the number of servo write tracks.

As shown in FIG. 8, the read-write offset in this example increases as the radial position of the servo write track changes from the inner diameter side to the outer diameter side. The increasing rate of the read-write offset decreases as the radial position of the servo write track changes from the inner diameter side to the outer diameter side. As described above, in the pattern writing sequence in the inner diameter-side area, the SSW controller 22 uses the measured APC to identify the Ref corresponding to each servo write track on which the write element 121 writes a pattern. Therefore, the SSW controller 22 can anticipate the profile of Ref in the outer diameter-side area (OUTER) from the profile in the inner diameter-side area (INNER).

For example, the SSW controller 22 can use a trigonometric function to identify a fitting line along the Ref curve in the inner diameter-side area and use a value on the line in the outer diameter-side area as the Ref corresponding to each servo write track.

Alternatively, measured data obtained from several HDAs of the same design allow pre-identifying to be a fitting function appropriate to the HDA of that design. The SSW controller 22 can calibrate a variable parameter of the prepared fitting function to identify a fitting curve along the Ref line in the inner diameter-side area. For example, in the example shown in FIG. 8, a quadratic function curve in which the Ref is the variable and the servo write track is the function value can be used as the fitting function.

While all Refs for the servo write tracks in the inner diameter-side area may be used to anticipate the change in Ref in the outer diameter-side area, from the point of view of efficient control, part of the data may be used to anticipate Refs in the outer diameter-side area. For example, a Ref value for every several servo write tracks or several tens of servo write tracks may be used to anticipate the Ref profile in the outer diameter-side area.

For accurate anticipation, it is preferable to use data outside a predetermined servo write track in the inner diameter-side area, because in an actual HDA, the change in read-write offset is large in the innermost area, so that HDA-to-HDA variations are often observed.

Therefore, the SSW controller 22 preferably does not use Refs inside the selected specific servo write track, but uses other Refs to anticipate the Ref corresponding to each servo write track in the outer diameter-side area. As described above, part of data for the servo write tracks after the selected servo write track may be used. This also applies to a Ref anticipation approach using another method described below.

One of preferable methods is to anticipate a Ref value in the outer diameter-side area using a value derived from a Ref value (read-write offset value) in the inner diameter-side area rather than directly using that Ref value. Particularly, using the rate of change in Ref allows more accurate and easier anticipation of a Ref value in the outer diameter-side area. The SSW controller 22 identifies the rate of change in Ref with respect to the servo write track in the inner diameter-side area.

That is, in this approach, the amount of change in Ref per servo write track is identified. The SSW controller 22 can anticipate the profile of the rate of change in Ref on the outer diameter side from the profile of the rate of change in Ref on the inner diameter side, so as to determine the Ref and target PES for each servo write track in the outer diameter-side area.

In one method, the profile of the rate of change in Ref (the amount of change in Ref per servo write track) is identified as follows: Let Inttrk(n) be the servo write track whose Ref is an integral multiple of the servo write track (servo write track multiplied by n: n is a positive integer). That is, when the write element 121 is at the position of the servo write track Inttrk (n), the Ref corresponds to the servo write track pitch multiplied by n. Let this Ref be Ref(n). For example, Ref(25) represents a Ref value of 25 servo write tracks. Inttrk(25) represents a servo write track whose Ref is 25 servo write tracks.

Figure 9:
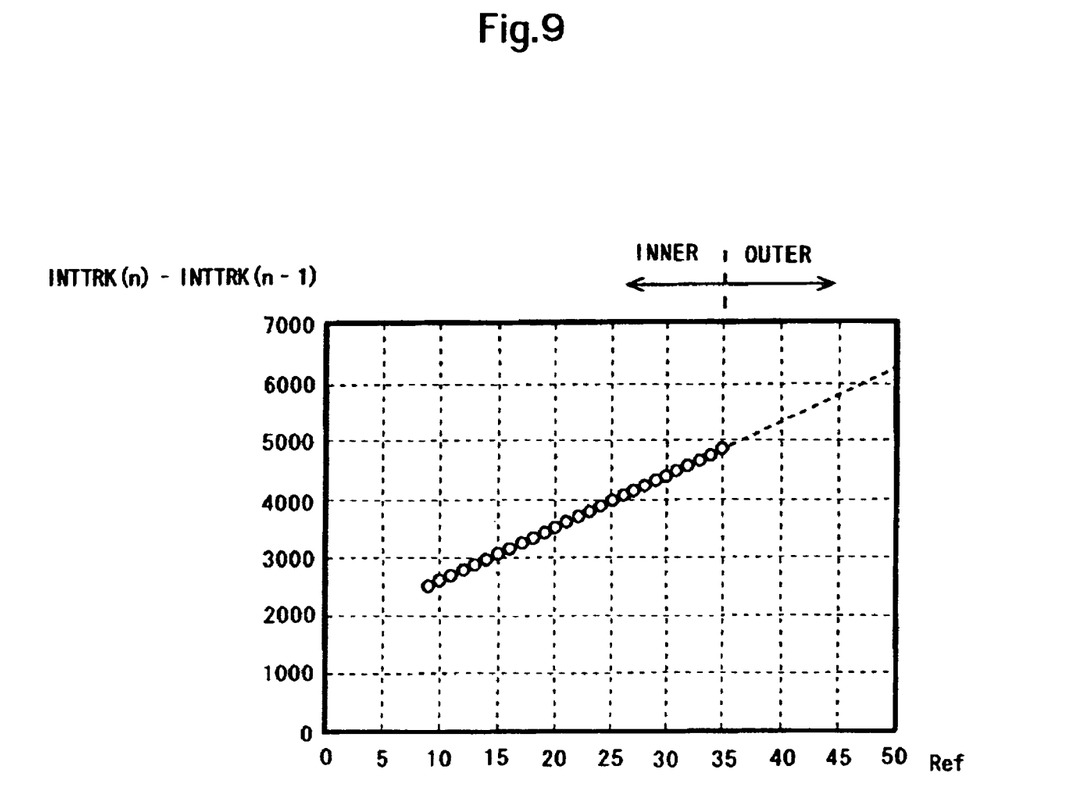
FIG. 9 is a graph diagrammatically showing one example of the relationship between Ref(n) and Inttrk(n)-Inttrk(n−1) according to an embodiment of the present invention.

For the graph shown in FIG. 8, the relationship between Ref(n) and Inttrk(n)-Inttrk(n−1) is expressed by the graph shown in FIG. 9. The X axis represents Ref(n) and the Y axis represents (Inttrk(n)-Inttrk(n−1)). (Inttrk(k)-Inttrk(k−1)) is the number of servo write tracks from Inttrk(k−1) to Inttrk(k). For example, the number of servo write tracks from the servo write track whose Ref is 24 to the servo write track whose Ref is 25 is (Inttrk(25)-Inttrk(24)).

Since the Ref increases as the radial position of the servo write track approaches the outer diameter side, the X axis of the graph shown in FIG. 9 represents the radial position or the servo write track expressed in terms of Ref(n). 1/(Inttrk(n)-Inttrk(n−1)) is the amount of change in Ref per servo write track from Ref(n−1) to Ref(n). Therefore, the SSW controller 22 can identify the rate of change in Ref with respect to the servo write track in the inner diameter-side area from the relationship shown in FIG. 9. Furthermore, from the relationship shown in FIG. 9, the rate of change in Ref in the outer diameter-side area can be anticipated with reference to the rate of change in the inner diameter-side area.

Specifically, the graph shown in FIG. 9 shows a change similar to a linear function. The SSW controller 22 applies, for example, the least square method to each point on the graph shown in FIG. 9, which is identified in the inner diameter-side area, so as to determine a fitting line. Values on the fitting line in the outer diameter-side area can approximate the rate of change in Ref in the outer diameter-side area. In the example shown in FIG. 9, for the servo write track whose Ref is 35 or smaller, the SSTW writes a pattern while measuring the APC. For the servo write track whose Ref is 35 or greater, the SSTW calculates the Ref corresponding to each servo write track from the anticipated rate of change in Ref and writes a pattern accordingly.

The SSW controller 22 saves each Ref(n) and Inttrk(n) in the pattern writing sequence in the inner diameter-side area. After patterns have been written from the inner diameter side to the selected servo write track, the servo write track whose Ref is 35 in this example, the SSW controller 22 approximates the relationship between the Ref and Inttrk(n)-Inttrk (n−1) for the tracks after the servo write track whose Ref is 35 according to the above-mentioned approach. From this approximation, the amount of change in Ref per servo write track after the servo write track whose Ref is 35, is calculated, and the APC-based track pitch control is switched to the approximate value-based control.

As described with reference to FIG. 8, when calculating a fitting line, the SSW controller 22 preferably only uses data after a specific servo write track to calculate a fitting line. For example, in the example shown in FIG. 9, data from Ref(20) to Ref(35) are used. The boundary between the inner diameter-side area and the outer diameter-side area may not necessarily be the servo write track whose Ref is an integer. For example, the SSTW can perform writing until a predetermined servo write track, for example, several thousand servo write tracks from Ref(20), and use anticipated Ref values to write patterns for the following servo write tracks.

Although the present invention has been described above with reference to the preferable embodiments, the invention is not limited to the above embodiments. Those skilled in the art can easily change, add and modify each element in the above embodiments within the scope of the invention. For example, embodiments of the present invention can be applied not only to an HDD but also to apparatuses using other types of disks. Although the servo write control device 2 according to embodiments of the present invention is a separate device from the HDD, the servo write control function can be incorporated in the control circuit implemented in the HDD. And although embodiments of the present invention are effectively used in the SSW in which patterns are sequentially written from the inner diameter side to the outer diameter side, embodiments of the present invention can also be applied to other types of SSW. Embodiments of the present invention can also be applied to servo write that uses a different reference from the APC to identify the read-write offset.

What is claimed is:

1. A method for writing a pattern on each track on a disk using a head having a read element and a write element disposed at different positions in the radial direction of the disk, the method comprising:

using the read element to read a pattern written by the write element and using the readout to identify the offset value between the read element and the write element in the radial direction;

based on the identified offset value, using the readout of the pattern on the disk obtained from the read element to move and position the write element;

using the write element to write a pattern at the track position where the write element is positioned;

after repeating the identification of the offset value, the moving of the write element and the writing of a pattern a plurality of times, using the preceding offset values identified by using the readouts to anticipate the following offset values; and based on the anticipated offset values, sequentially moving the write element to each track position and using the write element to write a pattern, wherein the relationship between the offset values identified by using the readouts and the tracks on which patterns have been written is used to anticipate the offset value corresponding to each of the following tracks, and wherein the rate of change in the offset values identified by using the readouts for the tracks on which patterns have been written is used to anticipate the rate of change in the offset values for the following tracks, and the anticipated rate of change is used to identify the offset value corresponding to each of the following tracks.

2. The method according to claim 1, wherein the relationship of the number of tracks between the tracks, each having an offset value identified by using the readout being an integral multiple of the track pitch, with the offset values of the tracks is used to anticipate the rate of change in offset values for the following tracks.

3. The method according to claim 1, wherein the offset values identified by using the readouts for the tracks are used to anticipate the change in the following offset values.

4. The method according to claim 1, wherein the write element writes a pattern on each track while the head is sequentially moved from the inner diameter side to the outer diameter side of the disk.

5. The method according to claim 1, wherein the difference between a preset reference value and the readout obtained from the read element is used to identify the offset value.

6. An apparatus for writing a pattern on each track on a disk, the apparatus comprising:

a write element that writes a pattern on the disk;

a read element that is disposed at a position different from that of the write element in the radial direction of the disk and reads the pattern written by the write element;

an actuator that supports and moves the read element and the write element; and a controller that uses the readout obtained by using the read element to read the pattern on the disk so as to control the actuator and moves and positions the write element, wherein in a first area of the disk, the controller uses the readout of the pattern that is written by the write element and read by the read element to identify the offset value between the read element and the write element in the radial direction, and based on the offset value, the controller uses the readout obtained from the read element to sequentially move and position the write element at each track position, the controller further uses the offset value identified by using the readout in the first area to anticipate an offset value in a second region of the disk, and in a second area, the controller sequentially moves and positions the write element at each track position based on the anticipated offset value, wherein the controller uses the relationship between the offset values identified by using the readouts in the first area and the tracks on which patterns have been written to anticipate the offset value corresponding to each track in the second area, and wherein the controller uses the rate of change in the offset values identified by using the readouts for the tracks on which patterns have been written in the first area to anticipate the rate of change in the offset values for the tracks in the second area.

* * * * *